(12) United States Patent
Shioda

(10) Patent No.: US 7,738,755 B2
(45) Date of Patent: Jun. 15, 2010

(54) OPTICAL WAVEGUIDE FILM AND PHOTOELECTRIC FILM

(75) Inventor: Tsuyoshi Shioda, Chiba (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 233 days.

(21) Appl. No.: 11/988,018

(22) PCT Filed: Jun. 30, 2006

(86) PCT No.: PCT/JP2006/313122

§ 371 (c)(1),
(2), (4) Date: Dec. 28, 2007

(87) PCT Pub. No.: WO2007/004575

PCT Pub. Date: Jan. 11, 2007

(65) Prior Publication Data
US 2009/0142026 A1    Jun. 4, 2009

(30) Foreign Application Priority Data
Jun. 30, 2005    (JP) ............................ 2005-192904
Sep. 16, 2005    (JP) ............................ 2005-269392

(51) Int. Cl.
*G02B 6/10* (2006.01)

(52) U.S. Cl. ............................ 385/130; 385/14; 385/15; 385/32; 385/33; 385/129; 385/131; 385/132; 385/133

(58) Field of Classification Search ............. 385/14–15, 385/32–33, 129–133
See application file for complete search history.

(56) References Cited

U.S. PATENT DOCUMENTS

| | | | |
|---|---|---|---|
| 6,489,774 B1 * | 12/2002 | van de Goor et al. | 324/439 |
| 6,709,607 B2 * | 3/2004 | Hibbs-Brenner et al. | 216/24 |
| 7,184,617 B2 * | 2/2007 | Korenaga et al. | 385/14 |
| 7,382,946 B2 * | 6/2008 | Oggioni et al. | 385/14 |
| 7,389,012 B2 * | 6/2008 | Oggioni et al. | 385/14 |
| 2002/0041740 A1 * | 4/2002 | O'Connor et al. | 385/89 |

FOREIGN PATENT DOCUMENTS

| | | |
|---|---|---|
| JP | 04-009807 A | 1/1992 |
| JP | 05-335696 A | 12/1993 |
| JP | 08-286064 A | 11/1996 |
| JP | 09-243846 A | 9/1997 |

(Continued)

OTHER PUBLICATIONS

International Search Report issued in PCT/JP2006/313122.

*Primary Examiner*—Frank G Font
*Assistant Examiner*—Guy G Anderson
(74) *Attorney, Agent, or Firm*—Buchanan Ingersoll & Rooney PC (57) ABSTRACT

An optical waveguide film and an electrical and optical hybrid circuit film having a high durability for folding while keeping the core size of the optical waveguide at a desired level are provided. The optical waveguide film is flexible, having a core made of a resin that composes an optical waveguide, a clad made of a resin, and a hollow groove extending in the same direction in which the core extends wherein at least at a portion of the optical waveguide film is folded so that the folding axis intersects with the core-extending direction at the portion. The films can contribute to the miniaturization of electronic devices.

11 Claims, 7 Drawing Sheets

FOREIGN PATENT DOCUMENTS

| | | |
|---|---|---|
| JP | 11-352344 A | 12/1999 |
| JP | 2001-188146 A | 7/2001 |
| JP | 2001-281484 A | 10/2001 |
| JP | 2002-318318 A | 10/2002 |
| JP | 2003-243779 A | 8/2003 |
| JP | 2006-23661 A | 1/2006 |

* cited by examiner

OPTICAL WAVEGUIDE FILM AND PHOTOELECTRIC FILM

TECHNICAL FIELD

The present invention relates to an optical waveguide polymer film. Particularly, the present invention relates to an optical waveguide polymer film flexible and foldable, and to an electronic device having the optical waveguide polymer film.

BACKGROUND ART

Inorganic materials such as quartz glass and multi-component glass characterized by a small optical propagation loss and a wide transmission band have been widely used as a base material for optical components or optical fibers. In recent years, polymer materials have been also developed. The polymer materials are excellent in workability and cost as compared with the inorganic materials, so that they receive attention as an optical waveguide material.

For example, a slab optical waveguide has been developed, that has a core-clad structure composed of a core made of a polymer having a high transparency such as polymethyl methacrylate (PMMA) and polystyrene, and a clad made of a polymer having a lower refractive index than the core material. Further, there has been put into practice a slab optical waveguide with low losses using a polyimide that is a transparent polymer having high heat resistance (for example, see Patent Document 1).

An optical waveguide made of the polymer materials is flexible, so that it is expected to be coupled with a semiconductor laser, a quartz optical fiber or the like, maintaining low losses without damaging the edges thereof (for example, see Patent Document 2).

Further, because the optical waveguide made of the polymer materials has flexibility, it is expected to be used similarly to a flexible electric circuit board used for electric circuits. The flexible electric circuit board is, for example, disposed in a manner that it bridges across two mother boards connected with each other with the help of a hinge as is found in cellular phones and the like. At the hinge, the flexible electric circuit board is rolled up into a bar or hollow with a curvature radius corresponding to the size of the hinge. Then, the flexible electric circuit board is covered with a protective hood or the like having a size slightly larger than the curvature radius.

In recent years, cellular phones are required to have high speed transmission performance, space saving capability and the like, so that the circuit board is folded at the hinge at a small folding radius (around 2 mm). Therefore, in the flexible electric circuit board, there have actually arisen problems such as noise troubles or picture quality degradation. Among the countermeasures to meet the problems, an optical wiring can be selected in place of conventional electric wirings. A flexible optical waveguide film may be one of the candidates for the optical wiring.

In the case where an electric wiring is required along with an optical wiring at the position bridging across the hinge so as to, for example, supply electric power to one of the mother boards, it is suggested to connect each wiring separately to the mother boards. Alternatively, it is suggested to use an electrical and optical hybrid circuit film, which has an electric wiring layer formed on an optical waveguide film. The electrical and optical hybrid circuit film may meet the requests for space saving, thin film fabrication, and miniaturization. However, the total thickness of a unified electrical and optical hybrid circuit film formed by laminating an optical waveguide film and a flexible printed circuit board becomes large (for example, over 150 μm), thereby the durability for folding possibly becomes lowered.

In order to make the thickness of the optical waveguide film so small as to increase the durability for folding, it is suggested to reduce the core size of the optical waveguide film. However, as the core size of the optical waveguide film becomes small, the allowance for positional shift with respect to the other optical components becomes small, leading to decrease in the optical coupling efficiency. For example, when the optical waveguide film and the other optical components are aligned for optical coupling with each other, the core diameter at an optical input is required to be around 100 μm to 150 μm at present. The optical waveguide film has an additional thickness of about 30 μm besides the core diameter. The optical waveguide film having such thickness possibly not only has optical losses, but also causes failures such as the rupture of the optical guide at a folded portion. Further, when the optical waveguide film and the electrical wiring film are unified by lamination, the folded portion gets still thicker by 10 μm to 50 μm, thereby the durability for folding becomes still more lowered.

On the other hand, a transfer process is known as one of the methods for producing the polymer optical waveguide film. The transfer process includes the steps of: coating a resin composing a clad to a mold having an projection corresponding to a core to obtain a clad film on which a groove is formed through transferring the projection, inside which the core is going to be formed; filling a resin composing the core into the groove on the clad film; peeling off the clad film from the mold; and further coating a resin composing a clad on the core in the groove to form an optical waveguide provided with the core embedded in a clad. In the transfer process, a core made of a polyimide is formed by coating and drying a resin precursor (polyamide acid) solution containing a number of solvents. When the solvents are evaporated, the size of the core is sometimes largely reduced. Considering better alignment between the optical waveguide and an emitting element, it is desirable that the core diameter is large. Therefore, in some cases, it is not desirable that the size of the core is reduced in the process.

Further, a process of machining a core with a dicing saw has been proposed (for example, see Patent Document 3) as one of the methods for producing the polymer optical waveguide film. Two grooves are formed using a dicing saw on a laminate including a layer composed of a core material and formed on a clad layer, and then a part of the layer composed of the core material is removed to form a core. After that, a clad material is coated over the laminate to fill in the grooves with the clad material. In accordance with this process, the thickness of the core can be increased, but the grooves are fully embedded with the resin. Therefore, for example, in order to make the core thickness be 50 μm through filling in the grooves on a film corresponding to the core, the total thickness of the film is required to be 100 μm or more. Such a thick film has a poor durability for folding and is also weak against twisting when the thick film is used while it is folded or rolled around a hinge in a device. To the contrary, when the total thickness of the film is reduced, the film becomes difficult to handle after the grooves are machined, and the film is sometimes warped or deformed when the clad material (resin) is embedded in the grooves.

Patent Document 1: Japanese Patent Laid-Open Publication No. H04-9807

Patent Document 2: Japanese Patent Laid-Open Publication No. 2002-318318

Patent Document 3: Japanese Patent Laid-Open Publication No. H08-286064

DISCLOSURE OF THE INVENTION

Problems to be Solved by the Invention

It is an object of the present invention to provide an optical waveguide film and an electrical and optical hybrid circuit film, that have a high durability for folding while the core size of the optical waveguide is kept at a certain level or more so as to avoid the aforementioned problems.

Means for Solving the Problems

Namely, the present invention relates to an optical waveguide film and an electrical and optical hybrid circuit film described below.

[1] An optical waveguide film including a core made of a resin composing an optical waveguide and a clad made of a resin, including a hollow groove extending in a same direction as the core-extending direction on at least a portion of the optical waveguide film, which is folded so that the folding axis intersects with the core-extending direction at the portion.

[2] The optical waveguide film as described in [1], wherein the thickness of the optical waveguide film is 200 µm or less.

[3] The optical waveguide film as described in [1] or [2], wherein the film thickness at the bottom of the groove is half or less of the thickness of the optical waveguide film.

[4] The optical waveguide film as described in any of [1] to [3] wherein: a first layer made of a clad material, a second layer made of a core material, and a third layer made of a clad material are laminated in this order;
   the groove is formed in a manner that the groove cuts the third and second layers and is disposed on both sides of the core to defines the core; and
   the bottom of the groove is disposed at the same height or lower than a boundary between the second and first layers.

[5] The optical waveguide film as described in any of [1] to [3], wherein: a first layer made of a clad material, a second layer made of a core material, and a third layer made of the clad material are laminated in this order;
   the groove is formed in a manner that the groove cuts the third and second layers and is disposed on both sides of the core to defines the core; and
   a forth layer made of a clad material is formed in a manner that the forth layer covers continuously the upper face of the third layer, the side walls of the third and second layers, and the first layer at the bottom of the groove.

[6] The optical waveguide film as described in any of [1] to [3], wherein the core is separated from the groove.

[7] The optical waveguide film as described any of [1] to [3], wherein the core constitutes a side of the groove.

[8] The optical waveguide film as described any of [1] to [3], wherein the core is disposed under the groove.

[9] An electrical and optical hybrid circuit film comprising: the optical waveguide film as described in any of [1] to [8], and a flexible printed circuit board being fixed on at least both ends of the optical waveguide film.

A second aspect of the present invention relates to an electronic device described below.

[10] An electronic device housing the optical waveguide film as described in any of [1] to [8] which is folded so that the folding axis intersects with the groove-extending direction.

[11] An electronic device housing the electrical and optical hybrid circuit film as described in [9] which is folded so that the folding axis intersects with the groove-extending direction.

The optical waveguide film of the present invention described above may have another layer in addition to the core layer and the clad layer. Another layer is, for example, a supporting film or an adhesive layer.

EFFECT OF THE INVENTION

The optical waveguide film and the electrical and optical hybrid circuit film of the present invention have an excellent durability for folding while having a core with a certain thickness or more. Therefore, the films can be housed as folded in an electronic device, and can be easily aligned with the other optical components (for example, photoelectric elements), whereby miniaturization of electronic devices can be attained.

BRIEF DESCRIPTION OF THE DRAWINGS

FIG. 1 shows a drawing of optical waveguides in exemplary embodiments of the present invention.

FIG. 2 shows an example of a flow chart for producing an optical waveguide film of the present invention.

FIG. 3 shows an example of a flow chart for producing an optical waveguide film of the present invention.

FIG. 4 shows a perspective view of an example of an optical waveguide film of the present invention.

FIG. 5 shows an example of a flow chart for producing an electrical and optical hybrid circuit film of the present invention.

FIG. 6 shows an example of a flow chart for producing an electrical and optical hybrid circuit film of the present invention.

FIG. 7 shows an electronic device having an optical waveguide film of the present invention housed therein.

BEST MODE FOR CARRYING OUT THE INVENTION

1. Optical Waveguide Film of the Present Invention

The optical waveguide film of the present invention is characterized by having a core composing an optical waveguide, a clad enclosing at least part of the core, and a groove extending in the same direction as the direction in which the core extends. The optical waveguide film of the present invention has flexibility and is capable of being folded at the portion having the groove.

The optical waveguide film of the present invention is characterized by being made of a resin. The resin ensures the flexibility of the film.

The thickness of the optical waveguide film according to the present invention is not limited as long as a desired flexibility can be obtained, but generally the upper limit is preferably 200 µm, more preferably 150 µm, and still more preferably 120 µm. The lower limit is preferably 20 µm and more preferably 40 µm, considering the properties of handling or waveguide performance. Note that, "the thickness of the optical waveguide film" means the thickness at the folding portion of the film not forming the groove. In addition, in the case where another layer (supporting film or the like) is adhered to the optical waveguide film, "the thickness of the optical waveguide film" means the total thickness including the thickness of the other layer. When the thickness at the folding portion of the film not forming the groove is not uniform, the maximum thickness thereof is regarded as the thickness of the optical waveguide film.

The groove of the optical waveguide film according to the present invention is preferably extended in the same direction as the direction in which the core that is a waveguide extends. The same direction includes a parallel direction, but is not necessarily limited to a parallel direction. For example, as long as the groove disposed between cores extends in a manner that the groove does not cut the cores by intersecting them, the direction in which the groove extends may be different from the direction in which the cores extend.

In order to increase the durability for folding, the thickness of the optical waveguide film according to the present invention at the bottom of the groove (that is, the remaining thickness of the film at the bottom of the groove) is preferably half or less of the thickness of the optical waveguide film (that is, the thickness at the folding portion of the film not forming the groove). The thickness of the film at the bottom of the groove means the maximum value thereof when the thickness is not uniform at the folding portion. Further, in the case where another layer (supporting film or the like) is attached under the bottom of the groove, the thickness of the film at the bottom of the groove means the total thickness including the thickness of the other layer. Still further, the aforementioned remaining thickness of the film at the bottom of the groove is preferably from 10 μm to 100 μm and more preferably from 20 μm to 75 μm.

The width of the groove formed in the optical waveguide film according to the present invention is not particularly limited, but may be selected as appropriate in accordance with the stiffness required for handling the optical waveguide film. Generally, the width of the groove is preferably smaller than the depth of the groove.

The groove may be present in at least part of the folding portion, and preferably may be present over the entire folding portion. The length of the groove is not particularly limited. The groove may run beyond the folding portion and may be present in the entire length of the optical waveguide film. Further, the groove present in the optical waveguide film may be straight or curved.

The optical waveguide film of the present invention includes one or two or more grooves. In the case where two or more grooves are included, each groove is formed preferably in the same direction with each other. The same direction includes the case where the grooves are formed in a parallel direction with each other, but they are not necessarily formed in parallel.

The groove of the optical waveguide film according to the present invention have a hollow inside thereof. Therefore, a film made of a clad material may be coated on the inside wall of the groove. In particular, a wall surface formed by cutting the core is preferably covered with a film made of a clad material. The film made of the clad material may have a thickness of around 1 μm. With this film, the cut surface is prevented from being exposed. In this way, a contamination of the core or an adverse effect to the optical waveguide performance can be prevented even when the cut surface is coated with a different resin by a user.

In the optical waveguide film of the present invention, the material of the core may be selected from transparent resins, and the material by itself is preferably foldable so as to allow the film by itself to be foldable. An example of the foldable transparent resins includes polyimide resin (including fluoropolyimide resin), silicon-modified epoxy resin, silicon-modified acrylic resin, silicon-modified polynorbornene and the like.

Further, in the optical waveguide film of the present invention, the material of the core is required to have a higher refractive index than that of the material of the clad described later. The refractive index can be adjusted, for example, in the case of polyimide resin, by regulating appropriately the composition of a diamine among a dianhydride and the diamine that become the structural units of the polyimide resin.

In the optical waveguide film of the present invention, the thickness of the core is not particularly limited as long as the thickness is selected so as to correspond to the diameter of the core required. From the viewpoint of making easy the alignment with the other optical components, the thickness is preferably 40 μm or more. The upper limit is not particularly limited, but preferably 100 μm or less. Further, the width of the core is around 40 μm to 200 μm, but is not particularly limited.

The thickness of the clad of the optical waveguide film according to the present invention is preferably made to be small so as to allow the optical waveguide film to have an increased flexibility. Therefore, the thickness is preferably made to be as thin as possible within the range where the core is kept free from optical leakage. For example, when the specific refractive index difference defined as "$(n_{core}-n_{clad}/n_{core}) \times 100$ (at 850 nm, room temperature)" between the refractive index $n_{core}$ of a core material and the refractive index $n_{clad}$ of a clad material is 1% or more, the thickness of the clad is sufficient when it is around 5 μm or more.

The core and groove of the optical waveguide film according to the present invention are formed in the same direction with each other as described above, but the relative positions between them may be selected as appropriate.

Figure 1A:
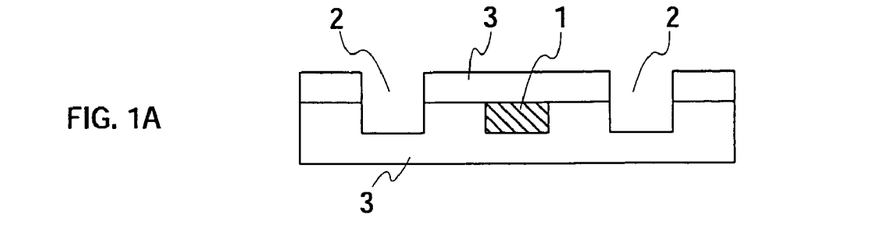

For example, core 1 can be disposed to be separated from groove 2 (see FIG. 1A). Between the core 1 and the groove 2, clad 3 can be interposed. When the groove 2 is present in plural, the core 1 is preferably disposed in the middle between the grooves.

Figure 1B:
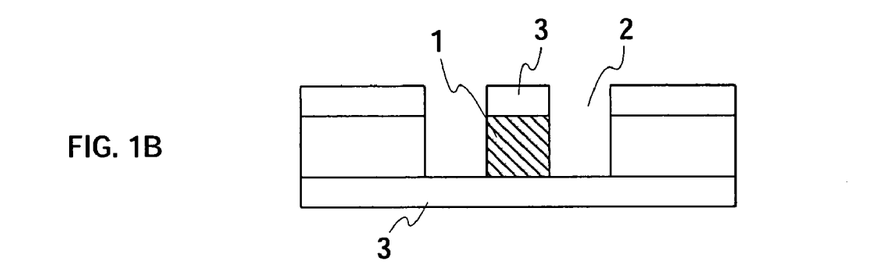
Figure 1C:
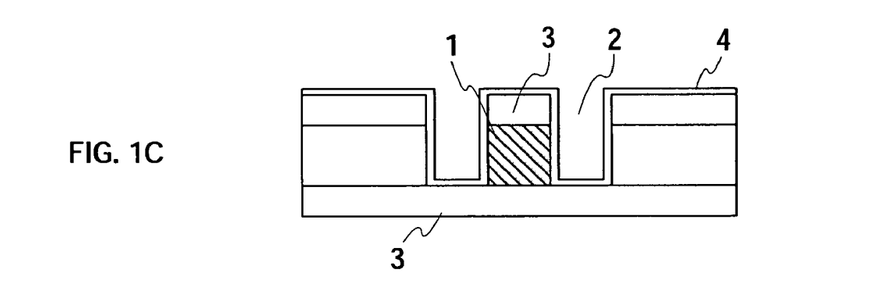

On the other hand, the core 1 may be disposed to constitute the side of groove 2 (see FIG. 1B). In the optical waveguide film shown in FIG. 1B, the internal space of the groove 2 itself serves as a clad so as to confine light in the core 1. Further, in order to protect the wall surface of the groove, protective film 4 made of a clad material may be provided on the wall surface (see FIG. 1C).

Figure 1D:
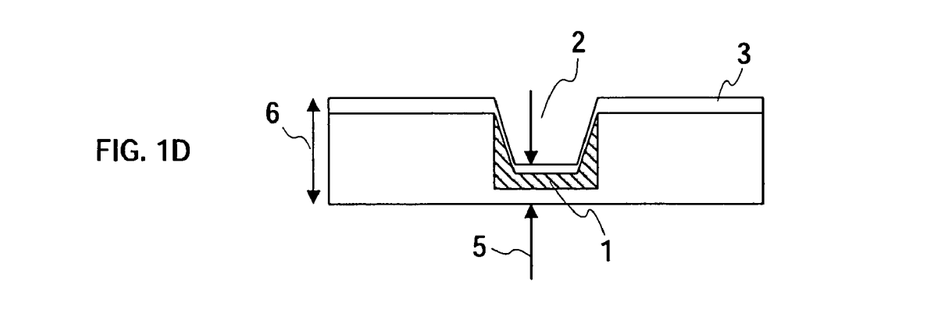
Figure 1E:
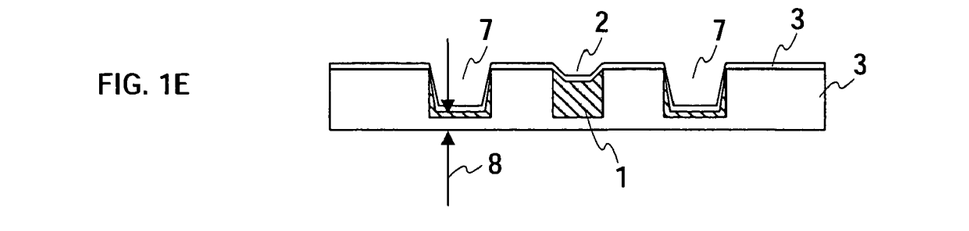

Further, the core 1 may be disposed under the groove 2 (see FIG. 1D). When the core 1 is disposed under the groove 2 and the depth of the groove is not sufficient, in other words, when thickness 5 of the film at the bottom of the groove is large (for example, when the thickness is half or more of thickness 6 that represents the thickness of the film at the portion where no groove is formed), it is desirable that an additional groove having a sufficient depth is provided separately (for example, see FIG. 1E). In the optical waveguide film shown in FIG. 1E, the core 1 is formed under the central groove 2. Since the thickness of the film at the bottom of the central groove 2 is large, grooves 7 having a sufficient depth are provided on the both sides thereof. A film thickness 8 at the bottom of the grooves 7 is made small.

Figure 4A:
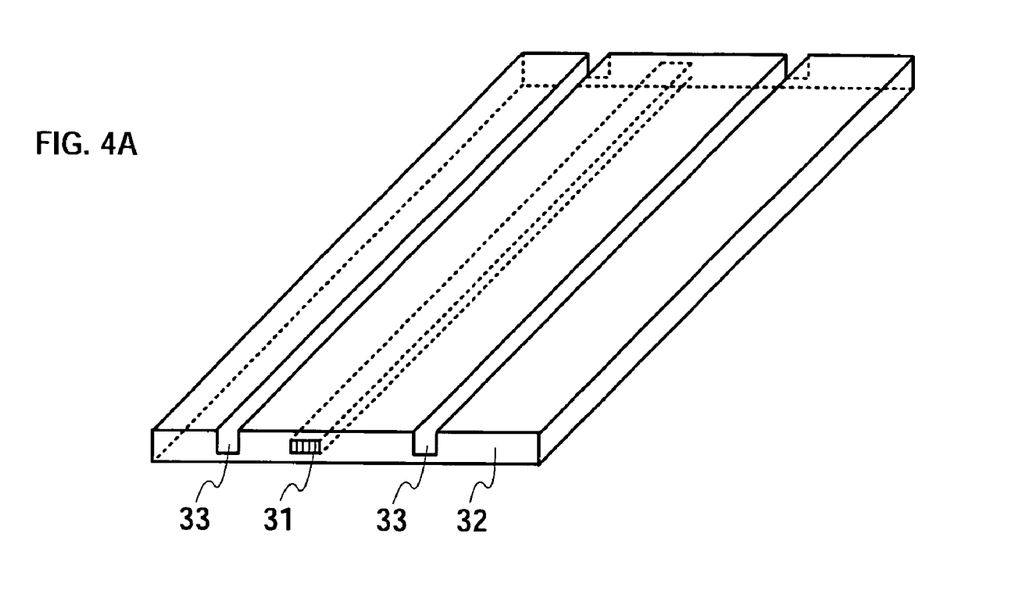
Figure 4B:
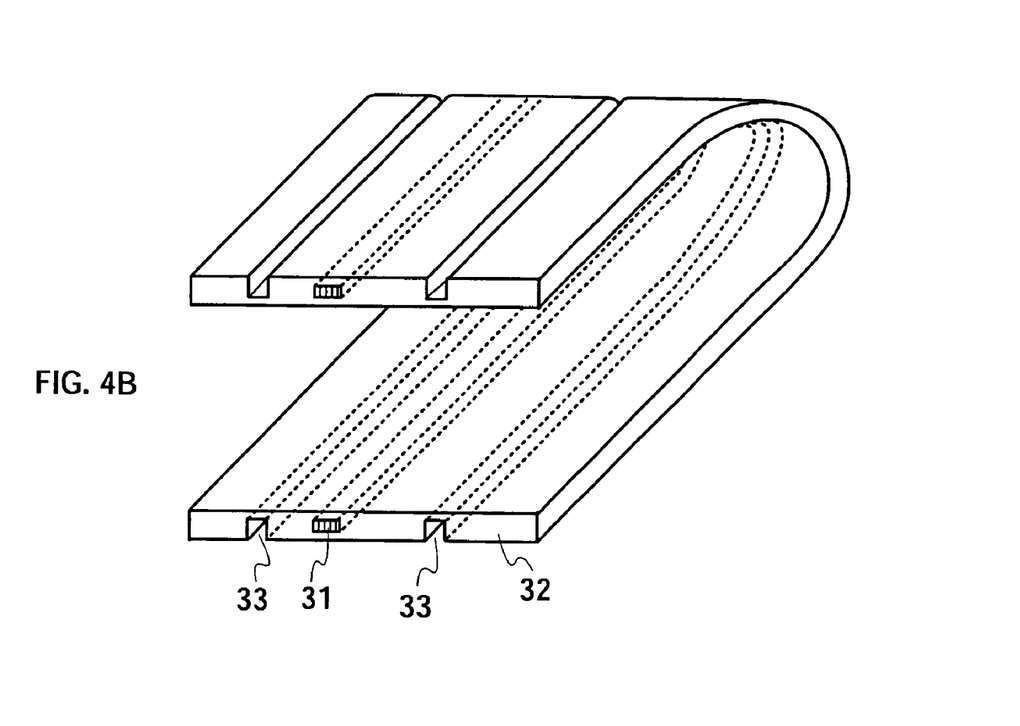

The optical waveguide film of the present invention is folded in a manner that the folding axis intersects with the direction in which the grooves extend (see FIG. 4B). Namely, in the folded film, the cross section in the direction in which the groove extends shows that the grooves are curved at the folding portion. In the folded film, the grooves may be disposed on the outside or inside of the folded portion. The grooves of the optical waveguide film according to the present invention work to release the stress of folding or twisting, so that the stress is reduced by the grooves. In this way, the optical waveguide film of the present invention has high durability not only for repeated folding but also for twisting.

The modulus of elasticity of the optical waveguide film according to the present invention is preferably from 1 GPa to 8 GPa at the folding portion. Here, "modulus of elasticity" means "modulus of tensile elasticity." The modulus of tensile elasticity represents the slope of a stress-strain curve in an elastic region. The stress-strain curve is measured with a tensile tester for a sample (5 mm wide, 80 mm long) having the same configuration as the film involved in the folding portion.

The optical waveguide film of the present invention may be laminated with a flexible printed circuit board to form an electrical and optical hybrid circuit board. The electrical and optical hybrid circuit board of the present invention is composed of the aforementioned optical waveguide film and a flexible printed circuit board, and each film is bonded and fixed at least at the both ends thereof. In order to increase flexibility, both films are preferably not bonded and fixed together at the folding portion. As a bonding and fixing method, there may be mentioned a method of sticking together the bonding and fixing portions of both films with an adhesive. The adhesive for bonding and fixing may be a thermoplastic polyimide, an epoxy resin and the like. In another method for bonding and fixing, the end of the optical waveguide film and the end of the flexible printed circuit board are inserted into a connector respectively, so that the two films may be bonded and fixed together through a member composing the connector. The flexible printed circuit board may be, for example, a known electric circuit board having a copper wiring pattern formed on a polyimide film. Even in the case where the optical waveguide film and the flexible printed circuit board are bonded together at the folding portion, the modulus of elasticity of each film is preferably from 1 GPa to 8 GPa at the folding portion.

The optical waveguide film and electrical and optical hybrid circuit board of the present invention are housed and used in an electronic device. The details will be mentioned later.

2. Method for Producing the Optical Waveguide Film of the Present Invention

The optical waveguide film of the present invention can be produced by any methods, but the methods may be classified roughly into the following two methods (method A and method B).

(Method A): A laminate having a first layer that is made of a clad material, a second layer made of a core material and provided on the first layer, and a third layer made of a clad material and provided on the second layer is prepared; and the third and second layers are cut out to form grooves exposing a core (see FIG. 2).

(Method B): A lower clad layer made of a clad material is formed; a groove serving as a core pattern is formed in the lower clad layer; a core layer made of a core material is formed inside of the groove serving as a core pattern; further, preferably an upper clad layer made of a clad material is formed on the core (see FIG. 3).

(1) About the Method A:

The foregoing laminate can be produced by laminating in the order of the first, second, and third layers on a substrate; or the first layer is formed on one face of the second layer, and the third layer is formed on the other face of the second layer. The clad material forming the first layer and the clad material forming the third layer may be the same or different.

The specific method for producing each layer may depend on the material that forms each layer, but for example, in the case of selecting a polyimide as the material, the layer may be formed by coating a polyamide acid solution and imidizing the resulting coating by heat treatment. The polyamide acid solution can be coated, for example, by spin coating.

Figure 2A:
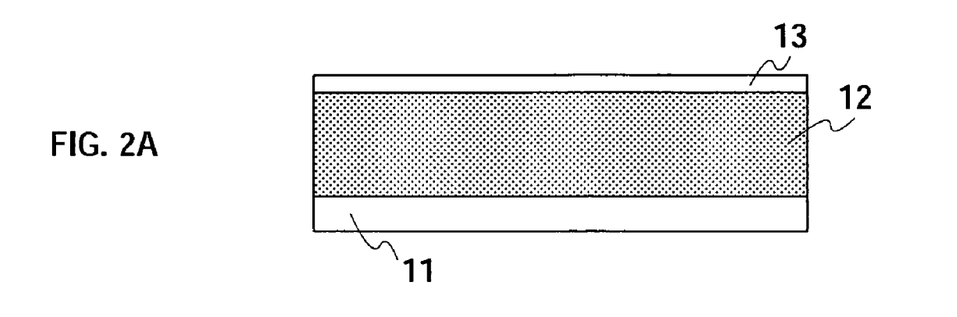

The foregoing laminate having the first to third layers is preferably formed on a substrate (see FIG. 2A: the substrate is not shown). An example of the substrate includes a silicon wafer. The first layer of the laminate is a layer 11 made of a clad material. The thickness of the first layer is not particularly limited, but generally preferably from 5 μm to 30 μm. The second layer of the laminate is a layer 12 made of a core material. The thickness of the second layer is not particularly limited, but may be selected so as to correspond to the core diameter of an optical waveguide film to be produced. Generally, the thickness is preferably from 40 μm to 100 μm. The third layer of the laminate is layer 13 made of a clad material. The thickness of the third layer is preferably as thin as possible within the range where the core is kept free from optical leakage. For example, when the specific refractive index difference of "$(n_{core}-n_{clad}/n_{core})\times 100$" between the refractive index $n_{core}$ of a core material and the refractive index $n_{clad}$ of a clad material is 1% or more, the thickness of the third layer 13 may be selected to be around 5 μm.

The laminate formed on the substrate is peeled off from the substrate. Peeling off from the substrate can be performed, for example, by immersing the laminate in an aqueous hydrofluoric acid solution. The laminate thus peeled off may be bonded to a supporting film.

Figure 2B:
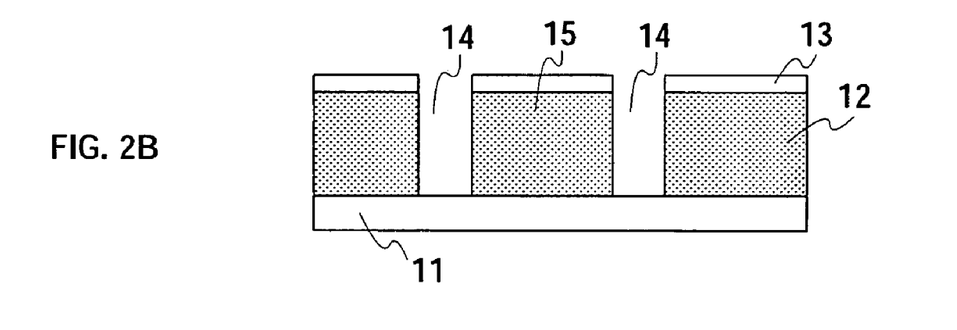

On the foregoing laminate having the first to third layers, two or more grooves 14 are formed from the side of the third layer 13 (see FIG. 2B). The depth of the grooves is preferably the total thickness of the third layer 13 and the second layer 12 or more. Namely, the core layer 12 is intercepted by the grooves 14 so as to provide core 15 serving as an optical waveguide; or the bottom of the grooves 14 is disposed preferably at the same height as the boundary between the second layer 12 and first layer 11 or below the boundary. The grooves 14 are preferably formed by machining using a dicing saw and the like. In this way, an optical waveguide film is obtained having the core 15 serving as an optical waveguide that is interposed between two or more grooves 14. From the optical waveguide film, a desired size component in which the core 15 and the grooves 14 are included can be cut out, and used.

Figure 2C:
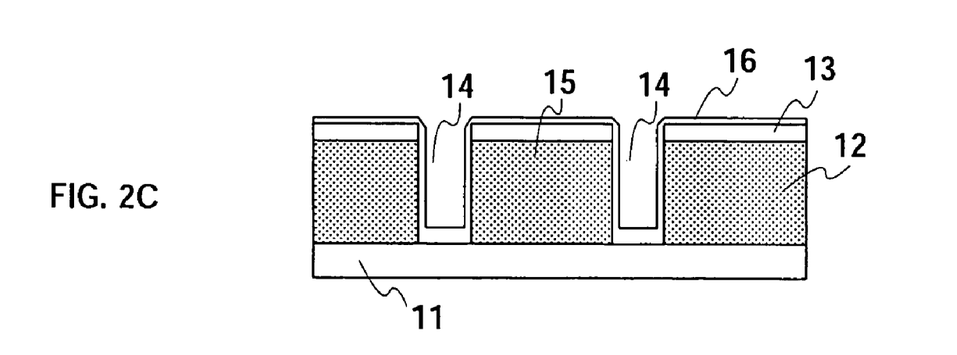

On the inside wall surface of the groove 14 formed, a forth layer 16 made of a clad material may be coated (see FIG. 2C). The forth layer 16 made of a clad material may have a thickness of around 1 μm. For example, a film made of polyimide can be formed by coating and heating a polyimide precursor (polyamide acid) solution.

(2) About the Method B:

Lower clad layer 22 made of a clad material is preferably formed on substrate 21. An example of the substrate 21 includes a silicon wafer. The lower clad layer 22, depending on the material thereof, for example, when it is a polyimide, can be formed by coating a polyamide acid solution and imidizing the resulting coating by heat treatment (see FIG. 3A).

On the lower clad layer 22, groove 23 serving as a core pattern is formed. The groove 23 serving as a core pattern can be formed by known photolithography and dry etching processes (see FIG. 3B).

Figure 3A:
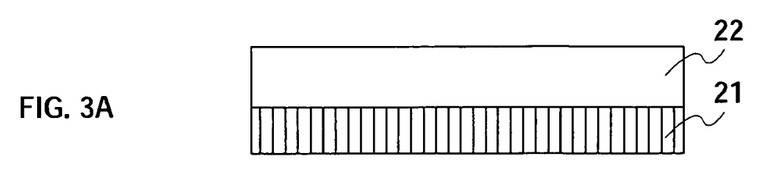
Figure 3B:
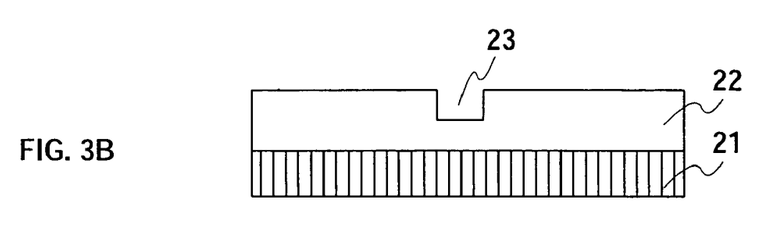
Figure 3C:
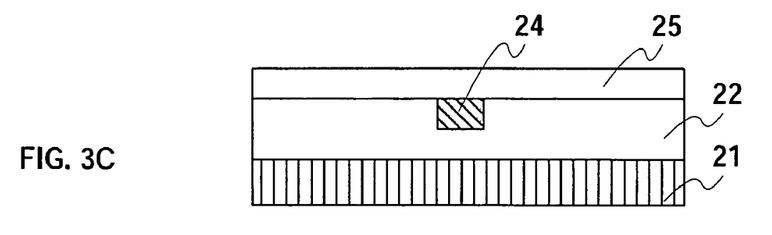

A core 24 is formed inside the groove 23 serving as a core pattern (see FIG. 3C). The core 24, depending on the material thereof, for example, when it is a polyimide, can be formed by coating a polyamide acid solution and imidizing the resulting coating by heat treatment.

Further, upper clad layer 25 is preferably formed on the core 24 formed inside of the groove 23 (see FIG. 3C). The upper clad layer 25, when the material is a polyimide, can be also formed by using a polyamide acid solution. The thickness of the upper clad layer 25 is preferably made as thin as possible within the range where the core 24 is kept free from optical leakage.

After that, the optical waveguide film formed on the substrate 21 is peeled off from the substrate 21. For example, in the case of an optical waveguide film made of polyimide and formed on a silicon wafer, the film can be peeled off by immersing it in an aqueous hydrofluoric acid solution. The optical waveguide film thus peeled off may be annealed. Residual stress can be reduced by annealing.

The optical waveguide film thus produced may have no groove (see FIG. 3C); or the groove serving as a core pattern may not be fully filled and a part of the groove may still remain.

In the case where the film has no groove, or where the depth of the groove is not sufficient or the film thickness at the bottom of the groove is large (for example, where the thickness at the bottom is larger than half of the film thickness at the portion where no groove is formed), it is desirable that new groove 26 is formed.

On the other hand, in the case where the groove 23 serving as a core pattern is not fully filled, the depth of the groove is sufficient, and the film thickness is small at the bottom of the groove (for example, where the thickness at the bottom is half or less of the film thickness at the portion where no groove is formed) a new groove is not required to be formed.

Figure 3D:
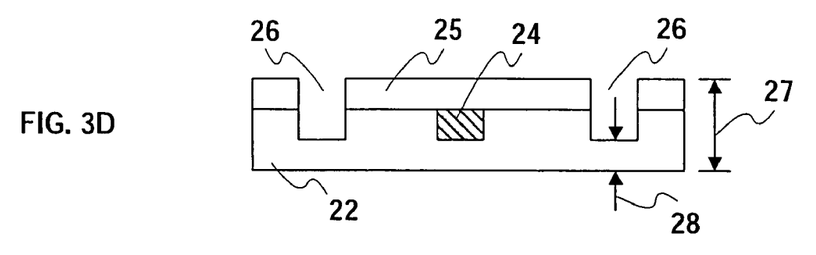

The new grooves 26 are formed preferably by machining using a dicing saw (see FIG. 3D). The film thickness 28 at the bottom of the new grooves 26 is preferably half or less of the film thickness at the portion where the grooves 26 are not formed. To put it another way, the depth of the new grooves 26 is preferably half or more of the film thickness at the portion where the grooves 26 are not formed.

Figure 3E:
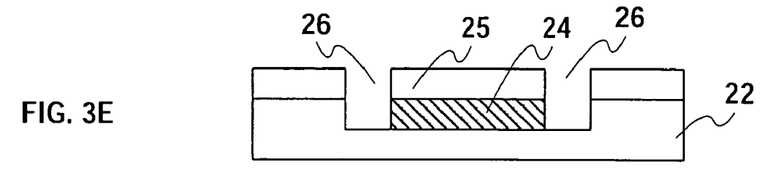

The new grooves 26 may be formed in a manner that they constitute the sides of the core 24 (see FIG. 3E). When the new grooves 26 are formed in a manner that they constitute the sides of the core 24, the space formed by the grooves 26 serves also as a clad and provides the function as an optical waveguide film.

Note that, as shown in FIG. 1D, in the case where the groove formed to serve as a core pattern has a sufficient depth and the thickness 5 is small even after the upper clad layer 3 is formed, no new grooves are required to be formed. The film processed in this way can be used as it is as the optical waveguide film of the present invention. Here, the thickness 5 can be regarded as small when it is half or less of the film thickness 6 at the portion where preferably no groove is formed.

FIG. 4 shows a perspective view of an example of the optical waveguide film according to the present invention produced by the method B. The optical waveguide film shown in FIG. 4 has a core 31; a clad 32 enclosing the core 31; and at the positions separated from the core 31, two grooves 33 extending in the same direction as the direction in which the core extends. FIG. 4B shows a folded form of the optical waveguide film shown in FIG. 4A.

Figure 5A:
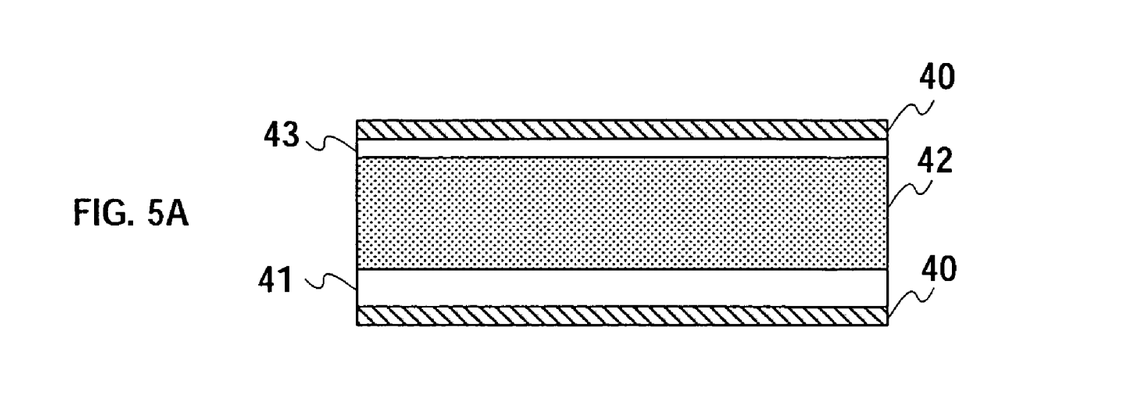
Figure 5B:
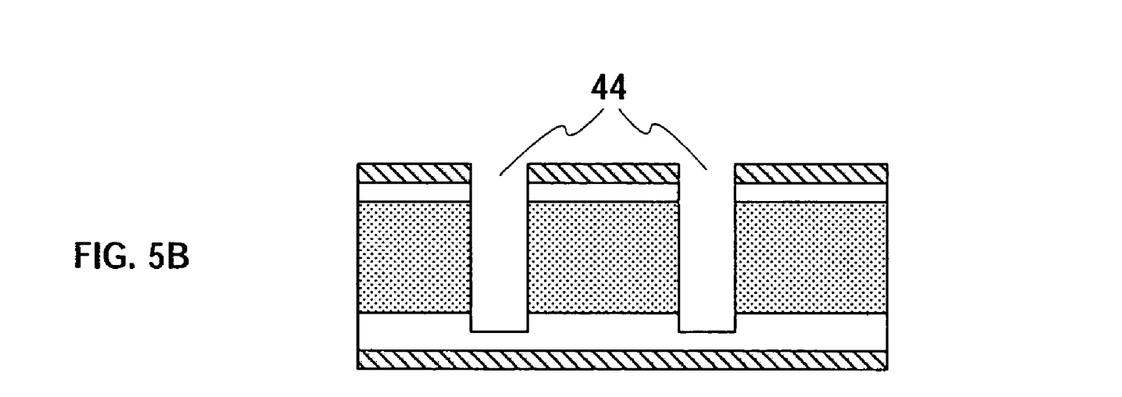

FIG. 5 shows a production example of an electrical and optical hybrid circuit board according to the present invention. In FIG. 5A, flexible printed circuit boards 40 are laminated on the both sides of a film composed of lower clad layer 41, core layer 42 and upper clad layer 43. Grooves 44 as shown in FIG. 5B are formed in a laminated board shown in FIG. 5A, so that the electrical and optical hybrid circuit board is produced.

Figure 6A:
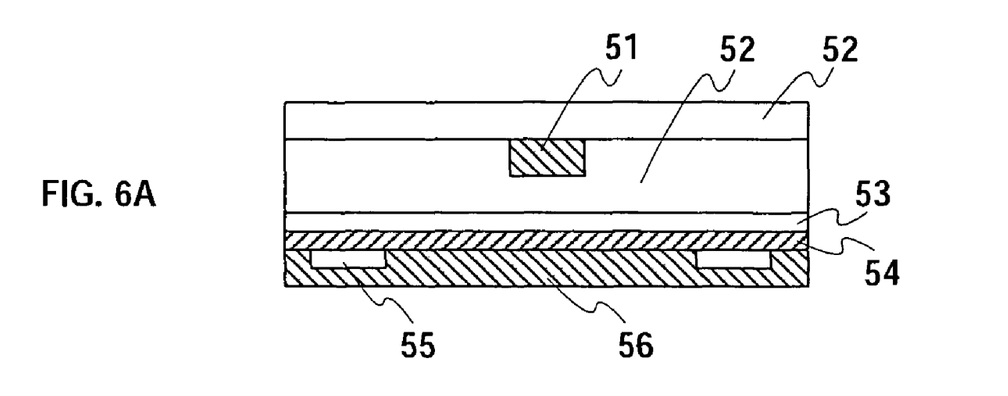
Figure 6B:
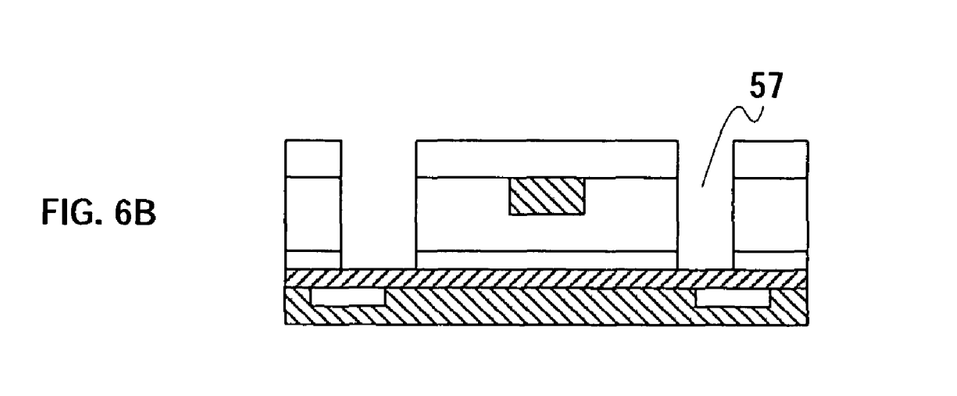

In FIG. 6, another production example of an electrical and optical hybrid circuit board according to the present invention is shown. FIG. 6A shows core 51, clad 52, adhesive layer 53 for lamination, resin layer 54 of a flexible electric wiring board, electric wiring layer 55, and cover layer 56. In a laminated board shown in FIG. 6A, grooves 57 are formed as shown in FIG. 6B, so that the electrical and optical hybrid circuit board is produced.

As mentioned above, the optical waveguide film and the electric wiring layer may be bonded together at the folding portion. And when the optical waveguide film and the electric wiring layer are bonded together at least at the both ends thereof, they are not necessarily bonded together at the folding portion.

3. Electronic Device of the Present Invention

The electronic device of the present invention is characterized by housing therein the aforementioned optical waveguide film or electrical and optical hybrid circuit film. Because the optical waveguide film and electrical and optical hybrid circuit film of the present invention have an excellent durability for folding (including the durability for flexure), they are preferably housed at a hinge or the like of an electronic device while they are folded in a manner that the folding axis intersects with the direction in which the groove is extended. The electronic device is not particularly limited. An example of the electronic device that has a hinge may include a cellular phone, a mobile such as a PDA and a game player, a notebook computer, and the like.

Figure 7A:
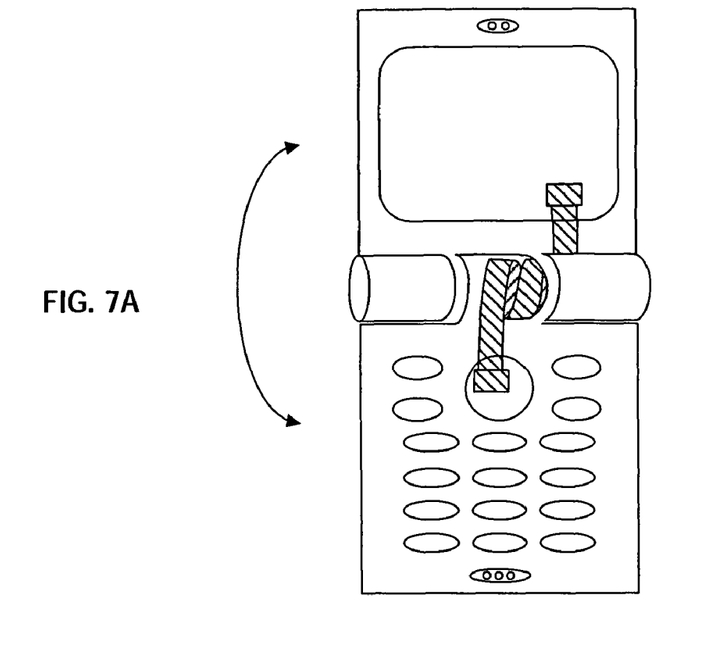
Figure 7B:
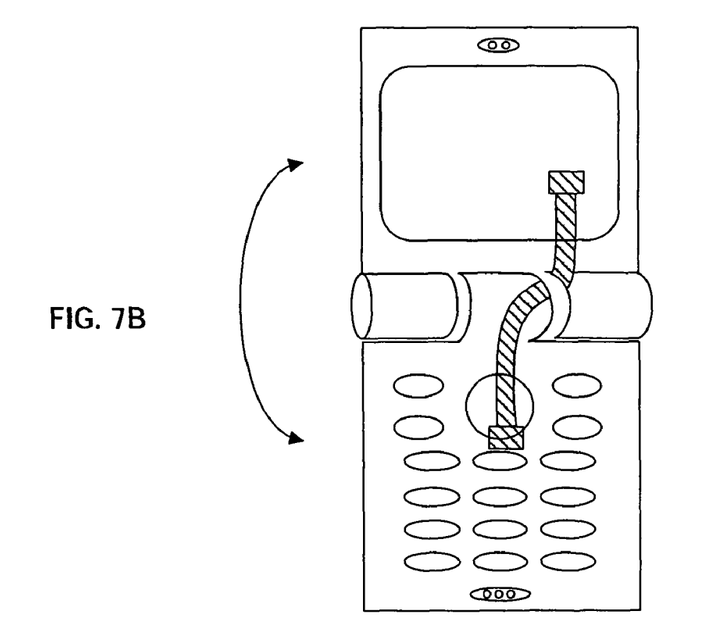

FIG. 7 shows an example of a cellular phone that houses therein the optical waveguide film or electrical and optical hybrid circuit film according to the present invention. The film is disposed across a hinge. In FIG. 7A, the film that is wound in spiral is disposed across the hinge. The film is kept folded in this condition. In FIG. 7B, the film that is straight but is slacked is disposed across the hinge. In this case, the film is folded when the cellular phone is folded up. Note that, in the folded film, the face having the groove may be either the outside or the inside face of the folded portion.

EXAMPLE

"OPI-N1005" (manufactured by Hitachi Chemical Co., Ltd.) that is a polyamide acid solution including a unit from 2,2-bis(3,4-dicarboxyphenyl) hexafluoropropane dianhydride (6FDA) and 2,2-bis(trifluoromethyl)-4,4'-diaminobiphenyl (TFDB) was used as a polyamide acid solution for a clad material.

On the other hand, "OPI-N3405" (manufactured by Hitachi Chemical Co., Ltd.) that is a copolymerized polyamide acid solution including unit from 6FDA and TFDB and unit from 6FDA and 4,4'-oxydianiline (ODA) was used as a polyamide acid solution for a core material.

In the following Examples, folding durability test was performed in two folding ways: in one way, the face having grooves faced the outside; and in the other way, the face having grooves faced the inside. There was no substantial difference in the results between these two ways.

Example 1

Method A

On a 5-inch silicon wafer, the polyamide acid solution for a clad material was coated and imidized by heating at 390° C. The film thickness after the imidization was set to be 25 μm.

The film obtained after the imidization served as a first layer made of a clad material. Next, on the first layer, the polyamide acid solution for a core material was spin-coated and imidized by heating so as to form a second layer made of a core material having a thickness of about 80 μm. Further, on the second layer formed, the polyamide acid solution for a clad material was spin-coated and imidized by heating so as to form a third layer made of a clad material having a thickness of 7 μm thick.

A three-layered film thus formed on the silicon wafer was peeled off from the silicon wafer by immersing it in a 5 wt % aqueous hydrofluoric acid solution. The modulus of elasticity of the three-layered film was about 3 GPa.

The first layer of the three-layered film peeled off was attached to a dicing tape. On the side of the third layer of the film thus attached, two grooves were formed using a dicing saw. The width of the grooves was set to be 50 μm, the depth of the grooves was 90 μm, and the distance between the grooves was 100 μm. The third layer made of a clad material and the second layer made of a core material were fully cut off. It became possible to confine light in the core formed between the grooves.

The film thickness at the bottom of the grooves was about 22 μm. After that, the dicing tape was peeled off to obtain an optical waveguide film. The optical waveguide film was crosstalk-free and was confirmed to function as an embedded-type optical waveguide.

The optical waveguide film was cut out into 5 mm wide and 100 mm long. In accordance with the folding durability test described in JIS C 5016, the number of folding at which the optical waveguide film was broken was examined at a folding radius of 2 mm. It was 300,000 or more.

Example 2

Method A

On a 5-inch silicon wafer, the polyamide acid solution for a clad material was coated and imidized by heating to obtain a 7 μm thick film. The film obtained after the imidization served as a first layer made of the clad material. On the first layer, the polyamide acid solution for a core material was spin-coated and imidized by heating to obtain a 60 μm thick film. The film obtained after the imidization served as a second layer made of the core material. Further, on the second layer, the polyamide acid solution for a clad material was spin-coated and imidized by heating to obtain a 7 μm thick film. The film obtained after the imidization served as a third layer made of the core material.

A three-layered film thus formed on the silicon wafer was peeled off from the silicon wafer by immersing it in a 5 wt % aqueous hydrofluoric acid solution. The modulus of elasticity of the three-layered film was about 3 GPa.

An 18 μm thick polyimide film was bonded to the entire face of the first layer of the three-layered film peeled off. The modulus of elasticity of the polyimide film was about 4.6 GPa. Between the three-layered film and the polyimide film, an adhesive layer was provided and the two films were bonded together by hot pressing. The adhesive layer was a 3 μm thick layer of a thermoplastic polyimide that was composed of structural units from oxydiphthalic dianhydride (ODPA) and aminophenoxy benzene (APB). The modulus of elasticity of the thermoplastic polyimide used for the adhesive layer was about 2 GPa.

In the laminate film composed of the three-layered film and a polyimide film, two grooves were formed on the side of the three-layered film using a dicing saw so as to obtain an optical waveguide film. The width of the grooves was 50 μm, the depth of the grooves was 70 μm, and the distance between the grooves was 100 μm. The third layer made of a clad material and the second layer made of a core material were fully cut off. It became possible to confine light in the core formed between the grooves. The total film thickness including the adhesive layer at the bottom of the grooves was about 25 μm.

The optical waveguide film thus obtained was cut out into 5 mm wide and 100 mm long. In accordance with the folding durability test described in JIS C 5016, the number of folding at which the optical waveguide film was broken was examined at a folding radius of 2 mm. It was 300,000 or more.

Example 3

Method A

On a 5-inch silicon wafer, the polyamide acid solution for a clad material was coated and imidized by heating to obtain a 7 μm thick film. The film obtained after the imidization served as a first layer made of the clad material. On the first layer, the polyamide acid solution for a core material was spin-coated and imidized by heating. The thickness of the resulting core layer after the imidization was 60 μm. The film obtained after the imidization served as a second layer made of the core material. Further, on the second layer, the polyamide acid solution for a clad material was spin-coated and imidized by heating to obtain a 7 μm thick film. The film obtained after the heat-imidization served as a third layer made of the core material.

A three-layered film thus formed on the silicon wafer was peeled off from the silicon wafer by immersing it in a 5 wt % aqueous hydrofluoric acid solution. The modulus of elasticity of the three-layered film was about 3 GPa.

The first layer of the three-layered film peeled off was adhered to a supporting film composed of a 20 μm thick adhesive layer and a 38 μm thick PET film. The modulus of elasticity of the supporting film was about 10 GPa.

In the laminate film composed of the three-layered film and the supporting film, two grooves were formed on the side of the three-layered film using a dicing saw. The width of the grooves was 50 μm, the depth of the grooves was 70 μm, and the distance between the grooves was 100 μm. The third layer made of a clad material and the second layer made of a core material were fully cut off. It became possible to confine light in the core formed between the grooves. The film thickness at the bottom of the grooves was about 62 μm.

The optical waveguide film having the supporting film was cut out into 5 mm wide and 100 mm long. In accordance with the folding durability test described in JIS C 5016, the number of folding at which the optical waveguide film is broken was examined at a folding radius of 2 mm. It was about 10,000.

Example 4

Method A

On a 5-inch silicon wafer, the polyamide acid solution for a clad material was coated and imidized by heating to obtain a 115 μm thick film. The film obtained after the imidization served as a first layer made of the clad material. On the first layer, the polyamide acid solution for a core material was spin-coated and imidized by heating to obtain a 60 μm thick film. The film obtained after the imidization served as a second layer made of the core material. Further, on the second layer, the polyamide acid solution for a clad material was spin-coated and imidized by heating to obtain a 7 μm thick film. The film obtained after the imidization served as a third layer made of the core material.

A three-layered film thus formed on the silicon wafer was peeled off from the silicon wafer by immersing it in a 5 wt % aqueous hydrofluoric acid solution. The modulus of elasticity of the three-layered film was about 3 GPa.

In the three-layered film thus peeled off, two grooves were formed on the side of the third layer using a dicing saw to obtain an optical waveguide film. The width of the grooves was 50 μm, the depth of the grooves was 70 μm, and the distance between the grooves was 100 μm. The third layer made of a clad material and the second layer made of a core material were fully cut off. It became possible to confine light in the core formed between the grooves. The film thickness at the bottom of the grooves was about 112 μm.

The optical waveguide film thus obtained was cut out into 5 mm wide and 100 mm long. In accordance with the folding durability test described in JIS C 5016, the number of folding at which the optical waveguide film was broken was examined at a folding radius of 2 mm. It was about 10,000.

Example 5

Method A

On a 5-inch silicon wafer, the polyamide acid solution for a clad material was coated and imidized by heating to obtain a 20 μm thick film. The film obtained after the imidization served as a first layer made of the clad material. On the first layer, the polyamide acid solution for a core material was spin-coated and imidized by heating to obtain a 70 μm thick film. The film obtained after the imidization served as a second layer made of the core material. Further, on the second layer, the polyamide acid solution for a clad material was spin-coated and imidized by heating to obtain a 7 μm thick film. The film obtained after the imidization served as a third layer made of the core material.

A three-layered film thus formed on the silicon wafer was peeled off from the silicon wafer by immersing it in a 5 wt % aqueous hydrofluoric acid solution. The modulus of elasticity of the three-layered film was about 3 GPa.

The first layer of the three-layered film peeled off and a 13 μm thick polyimide film were bonded with each other. The modulus of elasticity of the polyimide film was about 4.6 GPa. Between the three-layer film and the polyimide film, an adhesive layer was interposed. They were bonded together by hot pressing. An epoxy adhesive ("EPOX™" manufactured by Mitsui Chemicals, Inc.) was used for the adhesive layer. They were bonded together in a manner that the thickness of the adhesive layer became 10 μm, and the adhesive layer was not formed at the portion to be folded.

In the laminate film composed of the three-layered film and the polyimide film, two grooves were formed on the side of the three-layered film using a dicing saw so as to obtain an optical waveguide film. The width of the grooves was 50 μm, the depth of the grooves was 80 μm, and the distance between the grooves was 100 μm. The third layer made of a clad material and the second layer made of a core material were fully cut off. It became possible to confine light in the core formed between the grooves. The film thickness at the bottom of the grooves was about 17 μm.

The optical waveguide film thus obtained was cut out into 5 mm wide and 100 mm long. In accordance with the folding durability test described in JIS C 5016, the number of folding at which the optical waveguide film was broken was examined at a folding radius of 2 mm. It was 300,000 or more.

Comparative Example 1

Similarly to Example 1, a three-layered film was prepared, and cut out into 5 mm wide and 100 mm long. Without forming grooves, the number of folding at which the three-layered film was broken was examined in accordance with the folding durability test described in JIS C 5016 at a folding radius of 2 mm. It was 6,000.

Example 6

Method B

On a 5-inch silicon wafer, the polyamide acid solution for a clad material was coated and imidized by heating at 390° C. to form a 90 μm thick film. The film after the imidization served as a layer of the clad material (also referred to as "lower clad layer").

In the lower clad layer, one groove serving as a core pattern was formed by known photolithographic and dry etching processes. The depth of the groove was 70 μm, the width of the groove was 100 μm, and the length of the groove was 100 mm.

The polyamide acid solution for a core material was coated in a manner that it was filled in the groove formed, and a layer of the core material about 45 μm thick was formed in the groove by imidization with heating. Further, on the layer of the core material formed in the groove, the polyamide acid solution of a clad material was spin-coated and imidized by heating at 390° C. to form a 7 μm thick layer of the clad material (also referred to as "upper clad layer").

Thus formed laminate was immersed in a 5 wt % aqueous hydrofluoric acid solution so as to peel off it from the silicon wafer. The modulus of elasticity of the resulting laminate film was about 3 GPa.

In the optical waveguide film that was the laminate thus peeled off, four grooves were formed on the side of the upper clad layer by machining with a dicing saw. These four grooves were formed in a manner that one core line was disposed at the center thereof (or, disposed between the two grooves and the other two groves). Each groove had a width of 50 μm and a depth of 50 μm. The distance between the grooves was 500 μm. The film thickness at the bottom of the grooves was 40 μm as contrasted with 90 μm of the film thickness of the optical waveguide film.

Next, the film was cut out by dicing into 3 mm wide and 100 mm long that had a core at the center thereof to obtain an optical waveguide film with one channel. The number of folding at which the optical waveguide film was broken was examined in accordance with the folding durability test described in JIS C 5016 at a folding radius of 2 mm. It was 100,000 or more.

Example 7

Method B

Similarly to Example 6, on a5-inch silicon wafer, a film (film thickness: 100 μm) made of a clad material was formed. The film served as a lower clad layer.

On the lower clad layer, five grooves that served as a core pattern were formed by photolithography and dry etching. Each groove had a depth of 90 μm, a width of 60 μm, and a length of 110 mm. The distance between the grooves was 250 μm. Inside each of these five grooves, a layer made of a core material and a layer made of a clad material were formed. In each groove 90 μm deep, a 15 μm thick core layer was formed, further, an 8 μm thick upper clad layer was formed (the total thickness was 23 μm). The film thickness at the bottom of the grooves was 33 μm.

The laminate thus obtained was immersed in a 5 wt % hydrofluoric acid aqueous solution, so that the laminate was peeled off from the silicon wafer. The modulus of elasticity of the resulting laminate film was about 3 GPa. The laminate thus peeled off was cut out by dicing into 3 mm wide and 100 mm long that had a core at the center thereof to obtain an optical waveguide film with one channel. The number of folding at which the optical waveguide film was broken was examined in accordance with the folding durability test described in JIS C 5016 at a folding radius of 2 mm. It was 100,000 or more.

In this way, when the remaining thickness of the portion where grooves was formed after forming the core layer and clad layer in the grooves was reduced to be half or less of the total film thickness, sufficient durability for folding was obtained.

Example 8

Method B

Similarly to Example 7, on a 5-inch silicon wafer, a lower clad layer having five grooves serving as a core pattern was formed (regarding the five grooves serving as a core pattern, each groove had a depth of 70 μm, a width of 60 μm, and a length of 110 mm; and the distance between the grooves was 250 μm).

Among these five grooves (grooves 1 to 5) formed in the lower clad layer, to the inside of the three grooves disposed at every other groove (or, grooves 1, 3, and 5), the polyamide acid solution for a core material and the polyamide acid solution for a clad material were supplied using a dispenser so as to form a core layer and an upper clad layer. In this way, an optical waveguide film was formed on the 5-inch silicon wafer. Inside each groove 70 μm deep, a 40 μm thick core layer was formed, and a 5 μm thick upper clad layer was further formed (the total thickness of the layers embedded inside each groove was 45 μm). The film thickness at the bottom of the grooves in which core and clad layers were not embedded was 30 μm.

For the optical waveguide film (the modulus of elasticity thereof was 3 GPa) peeled off from the silicon wafer, the number of folding at which the optical waveguide film was broken was examined in accordance with the folding durability test described in JIS C 5016 at a folding radius of 2 mm. It was 100,000 or more.

Example 9

Method B

Similarly to Example 7, on a 5-inch silicon wafer, a lower clad layer having five grooves serving as a core pattern was formed (regarding the five grooves serving as a core pattern, each had a depth of 70 μm, a width of 60 μm, and a length of 110 mm; and the distance between the grooves was 250 μm).

To the inside of all of the five grooves formed in the lower clad layer, the polyamide acid solution for a core material and the polyamide acid solution for a clad material were supplied using a dispenser so as to form a core layer and an upper clad layer. In this way, an optical waveguide film was formed on the 5-inch silicon wafer. Inside each groove 70 μm deep, a 40 μm thick core layer was formed, and a 5 μm thick upper clad layer was further formed (the total thickness of the layers embedded in each groove was 45 μm). The film thickness at the bottom of the grooves was 75 μm.

For the optical waveguide film (the modulus of elasticity thereof was 3 GPa) peeled off from the silicon wafer, the number of folding at which the optical waveguide film was broken was examined in accordance with the folding durability test described in JIS C 5016 at a folding radius of 2 mm. It was 20,000.

Example 10

Method B

Similarly to Example 7, on a 5-inch silicon wafer, a lower clad layer having five grooves serving as a core pattern was formed (regarding the five grooves serving as a core pattern, each had a depth of 70 μm, a width of 60 μm, and a length of 110 mm; and the distance between the grooves was 250 μm).

To the inside of all of the five grooves formed in the lower clad layer, the polyamide acid solution for a core material and the polyamide acid solution for a clad material were supplied using a dispenser so as to form a core layer and a upper clad layer. In this way, an optical waveguide film was formed on the 5-inch silicon wafer. Inside each groove 70 μm deep, a 40 μm thick core layer was formed, and a 5 μm thick upper clad layer was further formed (the total thickness of the layers embedded inside each groove was 45 μm). The film thickness at the bottom of the grooves was 75 μm.

The lower clad layer of the optical waveguide film (the modulus of elasticity thereof was 3 GPa) peeled off from the silicon wafer was bonded through an adhesive layer to an entire surface of a base material for flexible electric wiring boards ("NEOFLEX™", manufacture by Mitsui Chemicals, Inc.: having copper layers on both surfaces thereof), wherein the copper layer had been removed from the entire surface to be bonded by etching. As the adhesive layer, a thermoplastic polyimide comprising unit from oxydiphthalic dianhydride (ODPA) and aminophenoxybenzene (APB) was used. The film, the adhesive layer, and the base material were hot pressed at 240° C. and 5 MPa.

After that, a resist was coated on the copper layer (non-etched layer) of the base material for flexible electric wring boards. Through lithographic patterning including light exposure, development, and etching processes, the copper layer was patterned. The copper layer thus patterned was covered with a coverlay except the portions serving as electrical terminals. The portions were nickel or gold plated. The total thickness of an electrical and optical hybrid circuit film thus prepared was 170 μm. The modulus of elasticity of the base material for flexible electric wiring boards was 4.6 GPa. The modulus of elasticity of the thermoplastic polyimide serving as the adhesive layer was about 2 GPa.

In the optical waveguide film of the electrical and optical hybrid circuit film, five grooves were formed using a dicing saw in a manner that the core was disposed at the center of the five grooves. In the five grooves, each had a depth of 100 μm and a width of 0.1 mm. For the electrical and optical hybrid circuit film having the grooves thus formed, the number of folding at which the optical waveguide film was broken was examined in accordance with the folding durability test described in JIS C 5016 at a folding radius of 5 mm. It was 10,000.

Comparative Example 2

Similarly to Example 10, an electrical and optical hybrid circuit film was prepared (no grooves were formed). For the electrical and optical hybrid circuit film having no grooves, the number of folding at which the optical waveguide film was broken was examined in accordance with the folding durability test described in JIS C 5016 at a folding radius of 5 mm, while the optical waveguide faced upward. It was 2,000.

INDUSTRIAL APPLICABILITY

The present invention provides an optical waveguide film and an electrical and optical hybrid circuit film that have an excellent durability for folding while having a core with a certain thickness or more. The films are capable of not only being folded and housed in an electronic device, but also making easy the alignment with the other optical components (for example, photoelectric elements). In addition, the films can contribute to the miniaturization of electronic devices.

The present application claims a priority right based on Japanese Patent Application No. 2005-192904 filed on Jun. 30, 2005 and Japanese Patent Application No. 2005-269392 filed on Sep. 16, 2005. All of the descriptions in the foregoing patent applications are hereby incorporated by reference into the specification of the present application.

The invention claimed is:

1. An optical waveguide film including a core made of a resin composing an optical waveguide and a clad made of a resin, wherein:
   the optical waveguide film is housed in an electronic device in a state that the optical waveguide film is folded at a folding portion about a folding axis so that the folding axis intersects with a core-extending direction, and
   the optical waveguide film includes a hollow groove at the folding portion, which hollow groove extends in a same direction as the core-extending direction.

2. The optical waveguide film according to claim 1, wherein the thickness of the optical waveguide film is 200 μm or less.

3. The optical waveguide film according to claim 1, wherein the film thickness at the bottom of the groove is half or less of the thickness of the optical waveguide film.

4. The optical waveguide film according to claim 1, wherein
   the optical wave guide film includes a first layer made of a clad material, a second layer made of a core material, and a third layer made of a clad material, which layers are laminated in this order;
   the groove is formed in a manner that the groove cuts the third and second layers and is disposed on both sides of the core to define the core; and
   the bottom of the groove is disposed at the same height or lower than a boundary between the second layer and the first layer.

5. The optical waveguide film according to claim 1, wherein
   the optical wave guide film includes a first layer made of a clad material, a second layer made of a core material, and a third layer made of the clad material, which layers are laminated in this order;
   the groove is formed in a manner that the groove cuts the third and second layers and is disposed on both sides of the core to define the core; and
   a forth layer made of a clad material is formed in a manner that the forth layer covers continuously the upper face of the third layer, the side walls of the third and second layers, and the first layer at the bottom of the groove.

6. The optical waveguide film according to claim 1, wherein the core is separated from the groove.

7. The optical waveguide film according to claim 1, wherein the core constitutes a side of the groove.

8. The optical waveguide film according to claim 1, wherein the core is disposed under the groove.

9. An electrical and optical hybrid circuit film comprising:
   the optical waveguide film according to claim 1 and
   a flexible printed circuit board being fixed on at least both ends of the optical waveguide film.

10. An electronic device housing the optical waveguide film according to claim 1, wherein
    the optical waveguide film is housed in the electronic device in a state that the optical waveguide film is folded at a folding portion about a folding axis so that the folding axis intersects with the core-extending direction.

11. An electronic device housing the electrical and optical hybrid circuit film according to claim 9, wherein
    the electrical and optical hybrid circuit film is housed in the electronic device in a state that the optical waveguide film is folded at a folding portion about a folding axis so that the folding axis intersects with the core-extending direction.

* * * * *